Dec. 13, 1960 J. SARGENT ET AL 2,964,703

RECORDING MICROWAVE HYGROMETER

Filed April 12, 1957 6 Sheets-Sheet 1

INVENTORS
Jack Sargent
George Birnbaum

BY Arthur Vinograd
Leonard F. Stoll
ATTORNEY

Dec. 13, 1960 J. SARGENT ET AL 2,964,703
RECORDING MICROWAVE HYGROMETER
Filed April 12, 1957 6 Sheets-Sheet 2
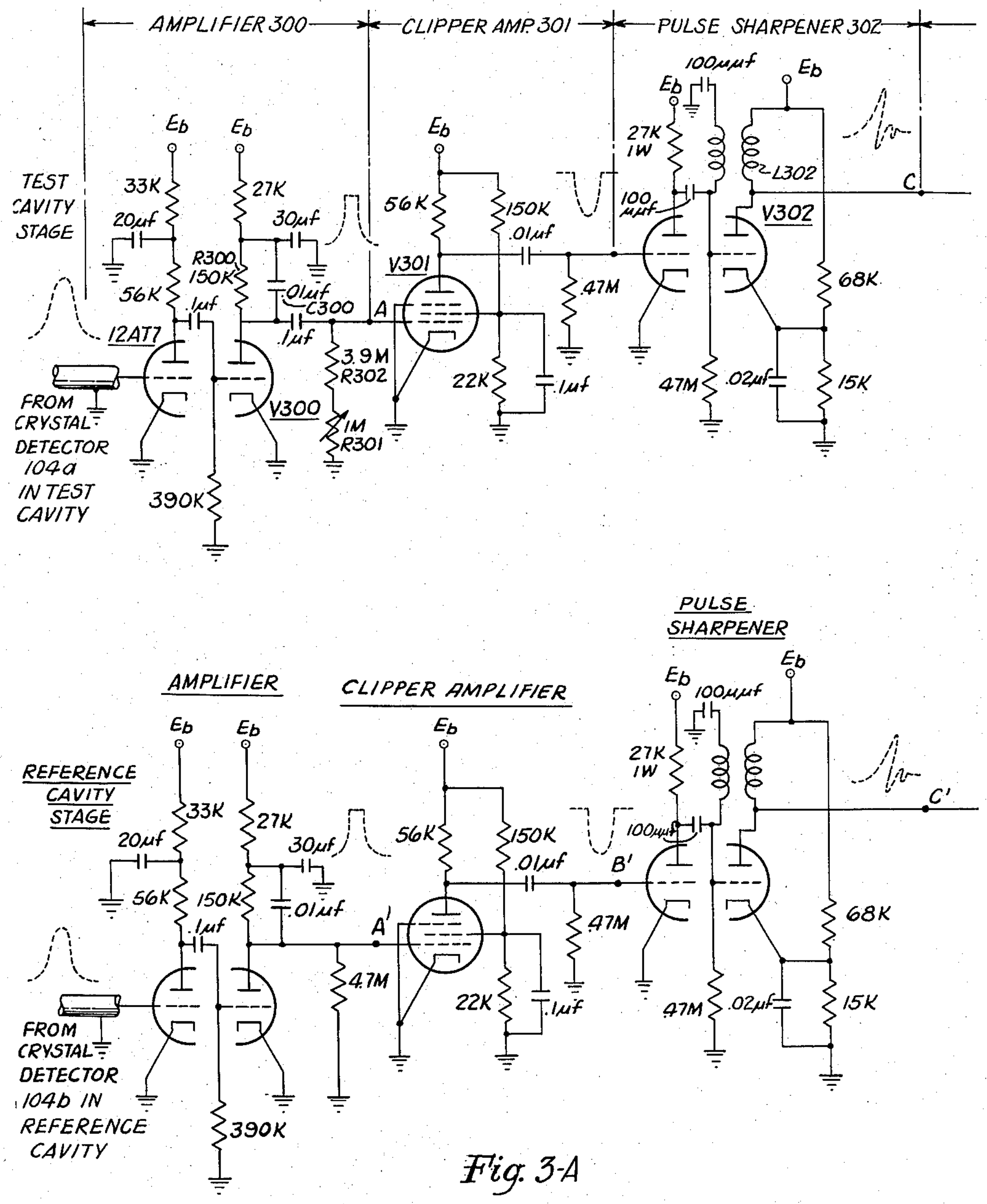
Fig. 3-A
ELECTRONIC CONVERTER AND CHOPPER AMPLIFIER 105, 106
INVENTORS
Jack Sargent
George Birnbaum
BY Arthur Vinograd
Leonard F. Stoll
ATTORNEY

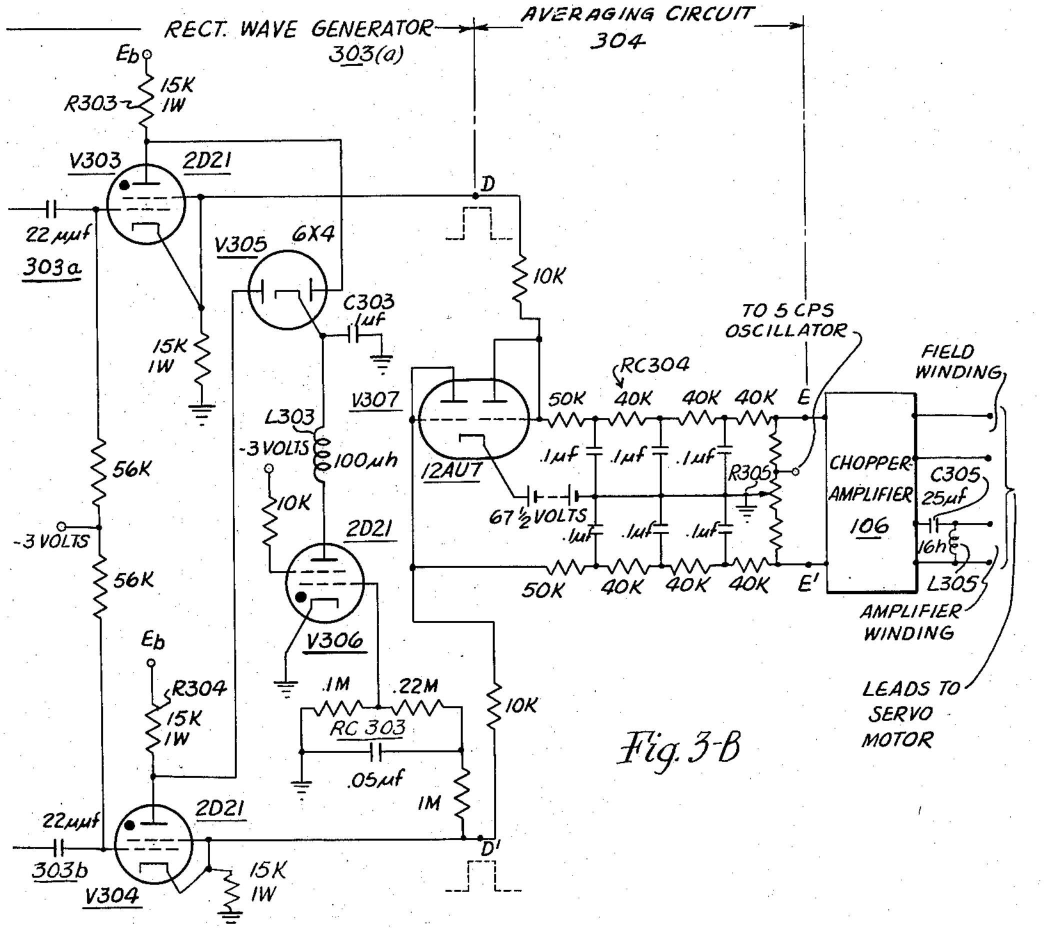
Fig. 3-B
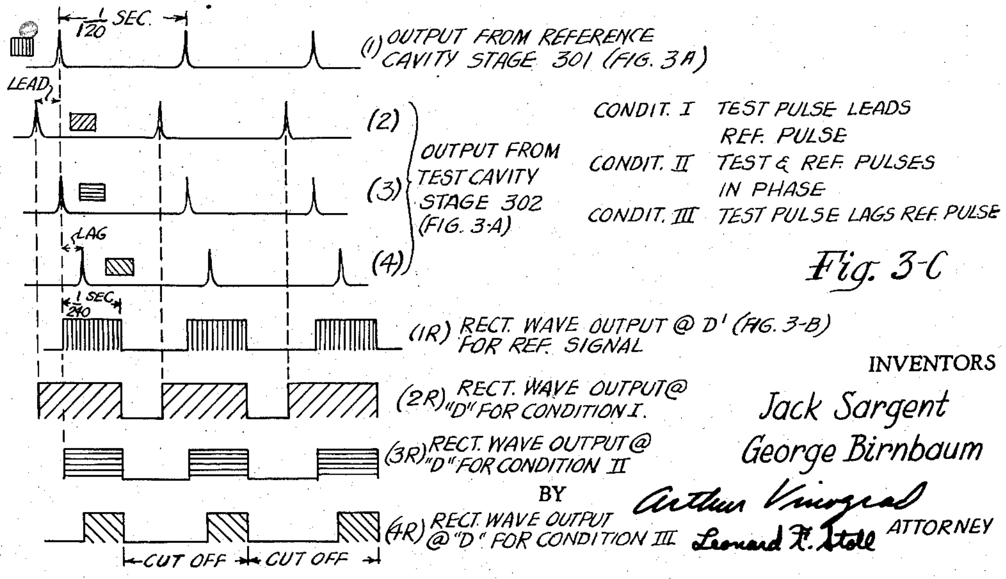
Fig. 3-C
INVENTORS
Jack Sargent
George Birnbaum
BY Arthur Vinograd
Leonard R. Stoll
ATTORNEY

RECORDING MICROWAVE HYGROMETER

Filed April 12, 1957

INVENTORS
Jack Sargent
George Birnbaum
BY Arthur Vinograd
Leonard F. Stoll
ATTORNEY INVENTORS
Jack Sargent
George Birnbaum
BY Arthur Vinograd
Leonard F. Stoll
ATTORNEY

TEMPERATURE CONTROLLER CIRCUIT

CHOPPER AMPLIFIER 804
FOR TEMP. CONT. CIRCUIT (FIG. 8)

INVENTORS
Jack Sargent
George Birnbaum
BY Arthur Vinograd
Leonard E. Stoll
ATTORNEY United States Patent Office 2,964,703

Patented Dec. 13, 1960

2,964,703

RECORDING MICROWAVE HYGROMETER

Jack Sargent, Silver Spring, Md., and George Birnbaum, Pacific Palisades, Calif., assignors to the United States of America as represented by the Secretary of Commerce Filed Apr. 12, 1957, Ser. No. 652,636

10 Claims. (Cl. 324—58.5)

This invention relates to the art of hygrometry and particularly contemplates a novel microwave refractometer which can measure and record the water-vapor pressure in air, as well as the index of refraction of gases, particularly at extremely low vapor pressures. In accordance with the principles of this invention, the difference in refractive index between dry and humid air is determined by means of microwave techniques. Such index value can then readily be converted to vapor pressure by an empirical formula. The instrument can initially be precisely calibrated by employing pure gases having known dielectric constants. In addition, the provision of an automatic null-balancing system in the instrument provides long-time stability of calibration.

Because most hygrometers lack either sensitivity or stability sufficient for precision work over a wide range of measurement, present day calibration methods such as are employed at the National Bureau of Standards do not utilize secondary standards, but require generation of known humidities by means of a pressure-humidity apparatus. See NBS Jour. Res. 269 (1952). The apparatus according to the present invention can accurately measure the relative humidity of a gas over a temperature range of 40° C. to −40° C. with a precision that enables its use as a secondary standard.

As will become apparent as the description proceeds, the principles of the present invention are not limited to the determination of water content in air but can readily be employed to determine the refractive index of a gas.

The instrument according to the present invention measures the increment of refractive index, due to presence of water vapor, of a flowing stream of air and thus provides a continuous record of humidity.

It is accordingly an immediate object of this invention to provide a recording hygrometer characterized by relatively high accuracy and sensitivity, stability and ease of operation.

It is a further object of this invention to provide a hygrometer which can measure the change in the dielectric constant of wet and dry air as manifested by a small change in the resonant frequency of a cavity resonator.

Another object of this invention is to provide a microwave hygrometer the accuracy of which is largely independent of frequency drift in the oscillator.

A still further object of this invention is to provide an instrument which can accurately determine the refractive index of gases.

The construction of the apparatus of this invention also makes feasible the detection and measurement of extremely small physical displacements.

Other uses and advantages of the invention will become apparent upon reference to the specification and drawings, in which.

Figure 4A:
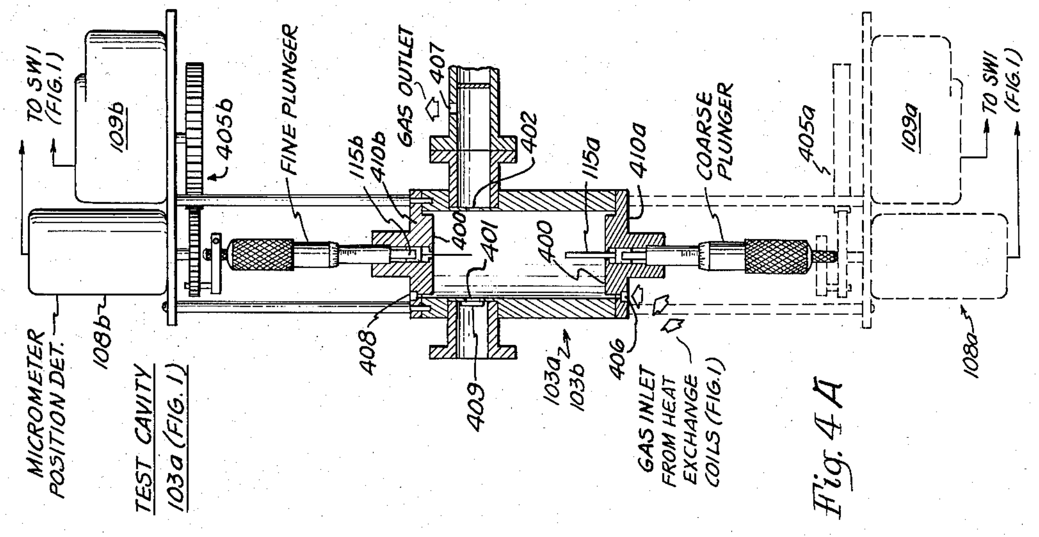
Figure 6:
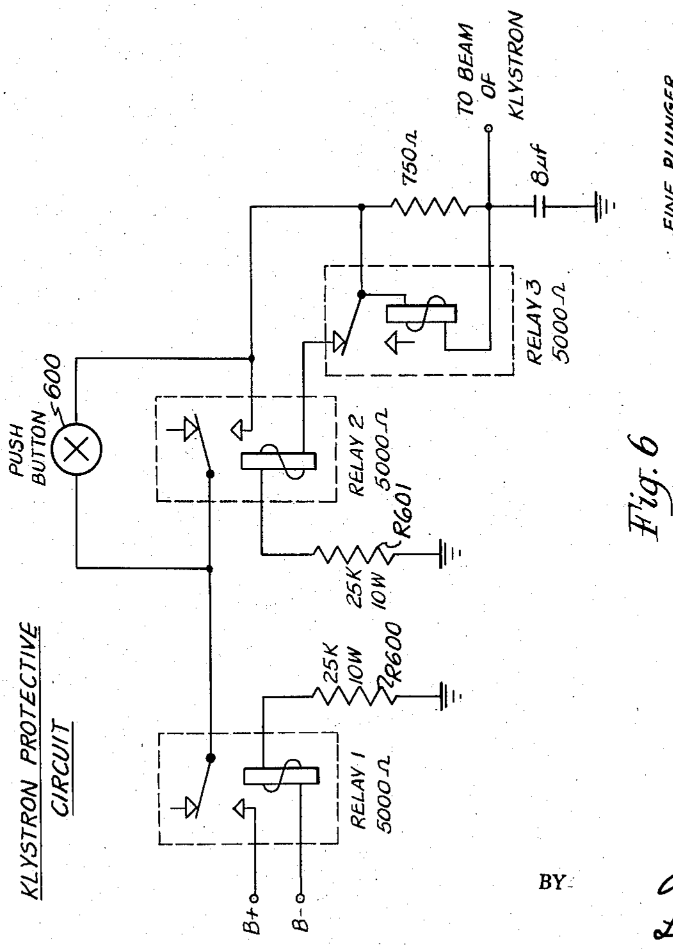
Figure 4B:
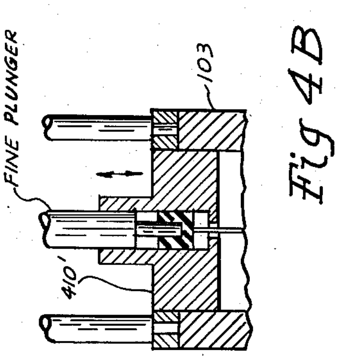
Figures 5, 7:
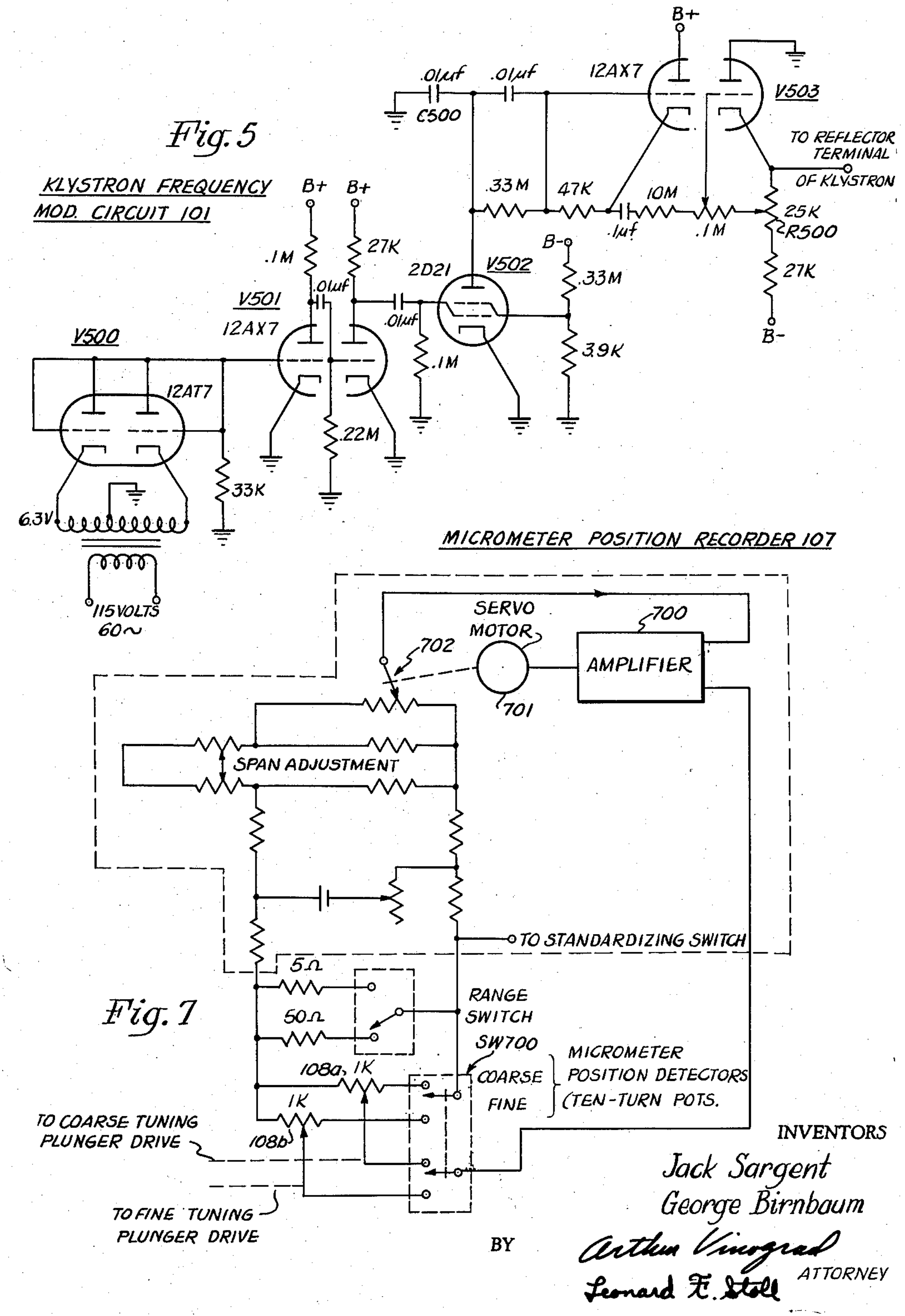
Figure 8:
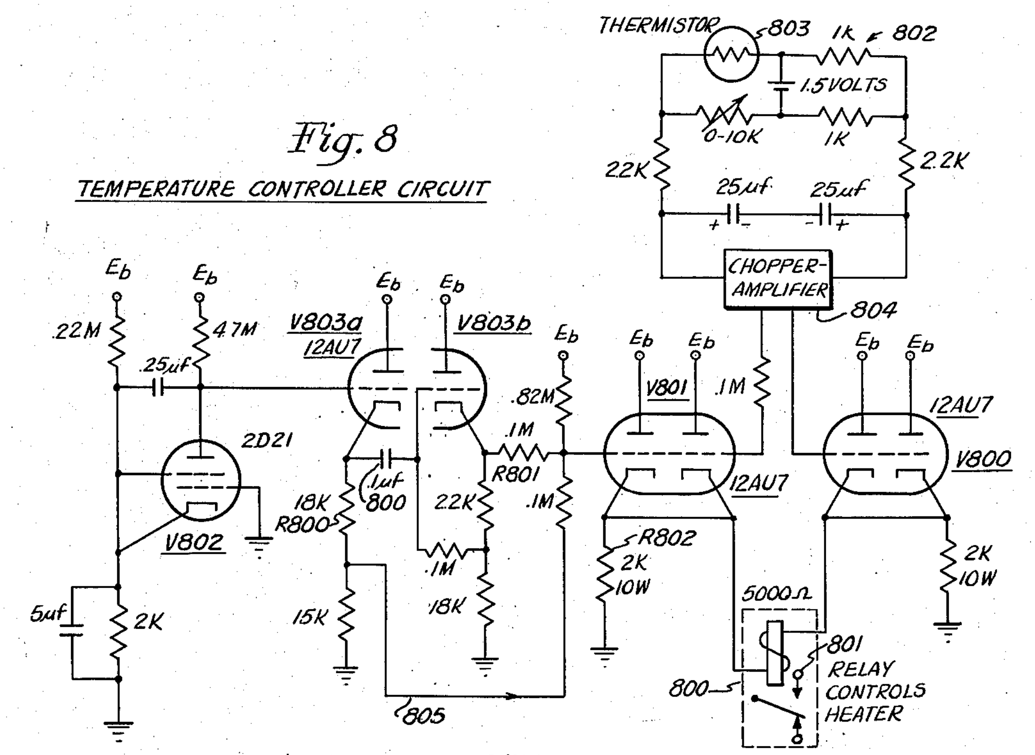
Figure 9:
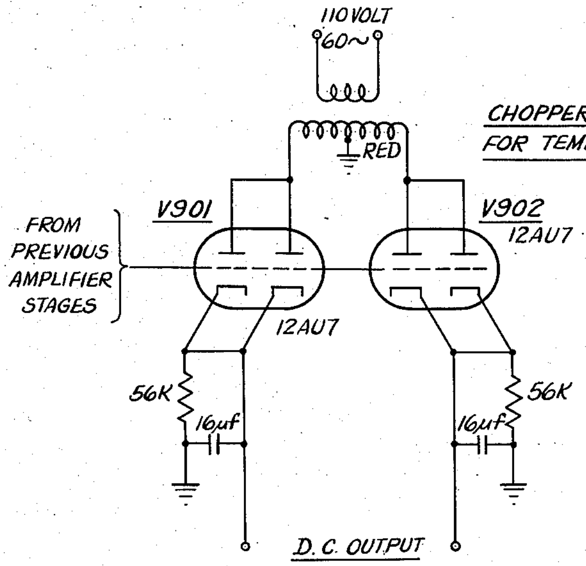

Figs. 3A—3B taken together, form a circuit diagram of the electronic converter employed in this invention;

Fig. 3C is a diagram illustrating the operation of the electronic converter circuit of Figs. 3A—3B;

Fig. 4A is a view partly in section showing the oscillator cavities together with the tuning control means employed in this invention;

Fig. 4B shows a slightly modified construction of a portion of the apparatus of Fig. 4A which provides for displacement measuring;

Fig. 5 shows the circuit employed for frequency modulating the radio frequency source in the apparatus of the present invention;

Fig. 6 illustrates the protective circuit for the radio frequency source;

Fig. 7 illustrates particular features of the micrometer position recorder employed in connection with the oscillator cavities;

Fig. 8 is a circuit schematic of the temperature controller employed to maintain constant temperature within the test chamber, and Fig. 9 is a circuit showing certain modifications of a conventional chopper-amplifier employed in connection with the temperature-controller circuit of this invention.

Before proceeding to a description of the apparatus of this invention certain general considerations concerning the physical properties exhibited by gases and water vapor should be noted. A variation in refractive index of air (at 45° C. and 760 mm. pressure) of 1.000250 to 1.000595 corresponds to a water vapor pressure range from zero to 95 mb. Accordingly, it is obvious that an accurate determination of such change in refractive index can be utilized to measure water-vapor pressure or humidity. Within recent years microwave techniques have been successfully employed to measure the refractive indices of gases with high precision and accuracy. By using such techniques, the refractive index of a gas can be measured with a sensitivity corresponding to 0.01 mb.

A transmission microwave cavity operating in the $TE_{01n}$ mode at a frequency of about $10^{10}$ c.p.s. can be designed to have a Q of greater than $10^4$. The frequency response of such cavity is measured in accordance with the principles of this invention by applying a microwave signal whose frequency is varied, and detecting the output of the cavity for resonance response by means of a detector such as a diode. Since the diode operates as a square-law detector at low power levels, its voltage output is proportional to the power transmitted through the cavity. When the applied signal frequency is well below or above the resonant frequency of the cavity, almost no power is transmitted; at resonance, the maximum power is transmitted. The determination of the resonant frequency of a cavity containing a particular gas thereby offers a means for comparing the properties of different gases such as air and air containing water vapor.

Over a narrow range, the resonant frequency of such a cavity is very nearly related to the susceptibility of the material within the cavity. Susceptibility may be defined as $\epsilon-1$ where $\epsilon$ is the dielectric constant. Thus by measuring the frequency shift when the cavity is evacuated (dielectric constant equal to unity) and then when filled with the desired gas to be tested, it is possible to obtain a measure of the dielectric constant or refractive index of the gas. See "A Recording Microwave Refractometer," by George Birnbaum, RSI, vol. 21, No. 2, February 1950. Since the frequency shift of such types of refractometers is also effected by the performance of the electronic circuits involved as well as by frequency drift in the oscillator, the present invention improves on the method disclosed in the Birnbaum article by employing a null-balance system to effectively minimize the errors consequent to such factors.

By employing a test and reference cavity, in the manner outlined in the Birnbaum article, comparison between a reference and test sample of a gas can be continuously made.

If the air to be tested is at atmospheric pressure and at a temperature of 45° C., then the approximate relation between refractive index, vapor pressure and frequency shift of the cavities is:

$$\Delta[(n-1)10^6] \doteq 3.63e \doteq 10^{-4}\ \Delta f \qquad (1)$$

where $e$ is the water-vapor pressure (mb.) of the air under test
$\Delta[(n-1)10^6]$ is the change in refractive index of the air due to water-vapor content
$\Delta f$ (c.p.s.) is the shift in resonant frequency of the cavity due to the change in refractive index.

The coefficient of the $\Delta f$ term is for a microwave cavity having a resonant frequency of $10^{10}$ c.p.s.

It will be apparent from Equation 1 above, that even for the maximum vapor pressure (100 mb.) to be measured, the change in resonant frequency to be measured is only 3.63 mc. which is quite small as compared to the resonant frequency of the cavity ($10^{10}$ c.p.s.). The need for an instrument having high sensitivity and good stability after calibration is therefore indicated. In particular, center frequency drift in a klystron type of oscillator produces noise in the output signal which results in an apparent change in the frequency swept out per unit time by the frequency-modulated signal employed. Since the instrument according to the present invention manifests the difference between the resonant frequencies of the test and reference cavities as a time interval, the above-noted noise effects, together with any inherent instability in the electronic circuits employed, would result in a change in the average D.-C. level of the rectangular wave employed to measure the time interval. Such change would be indistinguishable from the frequency separation of the cavities occasioned by the differences in the characteristics of the gases contained therein. To overcome such inherent error, the present invention employs a null-balance system which makes the instrument independent of those characteristics of the electronic components which contribute to instability and which eliminates the noise output occasioned by frequency drift of the klystron.

Figure 1:
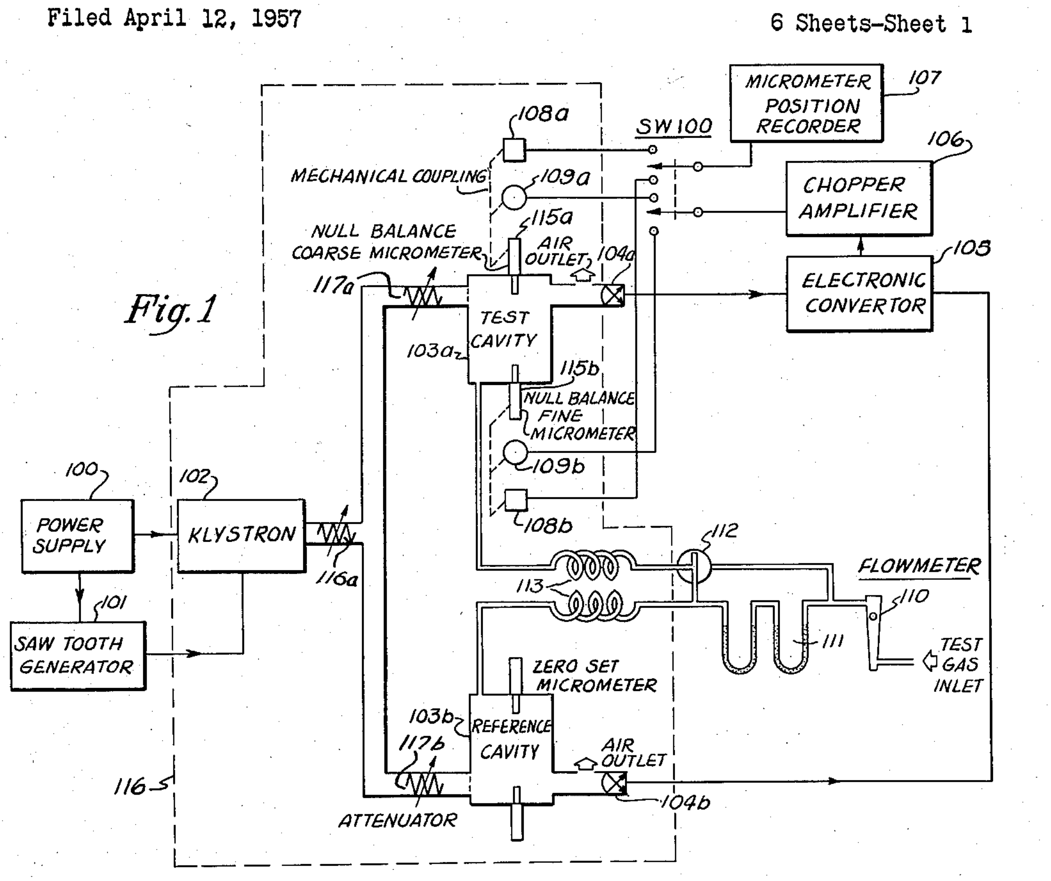
Fig. 1 is an over-all schematic diagram showing the principles of the present invention embodied in the form of a gas refractometer or hygrometer.

Basically, the null-balance technique employed in accordance with the principles of this invention consists of changing the volume of the test cavity (103*a*, Fig. 1) by an amount which is equal to the frequency shift occasioned by the change in refractive index of the gas being tested. Such volume change may be accomplished through a servo-operated micrometer-plunger acting as a tuning element in a test cavity. Since, as indicated in Fig. 1, the modulated carrier wave from klystron 102 is applied to both a test and reference cavity, the resonant pulses derived therefrom will be displaced in time in accordance with the equation:

$$T = \frac{f_s}{f_d f_m} \qquad (2)$$

where

T is the time displacement vs. resonant pulse
$f_s$ is the resonant frequency separation of the cavities
$f_d$ is the frequency deviation of the carrier signal
$f_m$ is the modulation frequency carrier signal.

As stated, drift of the center frequency of the klystron will result in an apparent change in the frequency swept out per unit time by the frequency modulated signal. Then if the modulation frequency of the klystron is $f_m$ c.p.s., the frequency deviation $f_d$ c.p.s. and the resonance frequency separation of the cavities is $f_s$ c.p.s., the change in the time interval ($\Delta$T) which occurs during one sweep between the resonant pulses due to a center frequency drift rate of the klystrons of $f_k'$ c.p.s. is:

$$\Delta T = \frac{f_s f_k'}{(f_d f_m)^2} \qquad (3)$$

where $$f_k' \ll f_d f_m$$

Therefore if the null-balance test cavity frequency is set equal to the frequency of the reference cavity, $f_s$ will equal 0 and, in accordance with Equation 3, the output noise will be independent of klystron drift effects. In order to relate the tuning plunger to the proper position to render $f_s=0$, the apparatus of the present invention employs a converter for energizing the micrometer drive servomotor which not only produces a signal proportional to the resonant frequency displacement, but which also discriminates between lead and lag of the test pulse with respect to the reference pulse. Moreover, as will be shown, the electron circuits employed and the parameter of the frequency modulated signal affect only the sensitivity at null-balance but do not affect the position of the cavity tuning plunger.

The output signal of the converter is changed into an A.-C. signal by means of a chopper-amplifier. Such signal is then applied to a two-phase servomotor which is mechanically coupled to the micrometer feed associated with the tuning plunger. When a change in dielectric (of the gas within the cavity) occurs, the servomotor rotates the micrometer feed drive in a direction which tends to reduce the converter output signal to zero. At such position of balance, the resonant frequency of the test and reference cavities will be equal. The direction in which the servometer rotates and its speed depends on the polarity and amplitude of the signal supplied by the converter to the chopper-amplifier.

On the basis of the above-outlined principles, the present invention provides a hygrometer of high sensitivity and extreme accuracy in the manner schematically disclosed in Fig. 1 of the drawings. The apparatus shown in Fig. 1 employs a power supply 100 for energizing a source of microwave signals 102 which may be in the form of a klystron, and a sawtooth generator 101. The sawtooth generator is used to frequency modulate the microwave signal source 102 linearly with time by applying a sawtooth signal to the reflector electrode of the klystron.

The R.-F. power from the R.-F. source 102 is then applied to two cavity resonators 103*a* and 103*b*, the first functioning as a test cavity, the latter as a frequency reference-cavity. Attenuators 116*a*, 117*a* and 117*b* are provided in the waveguid between the klystron and the cavities to prevent frequency pulling of the klystron. The output of each cavity is applied to respective detectors 104*a*, 104*b* which may be in the form of crystal detectors.

The frequency deviation provided by the linear sweep 101 is sufficient to sweep out the entire resonant response curves of both cavities.

Figure 2:
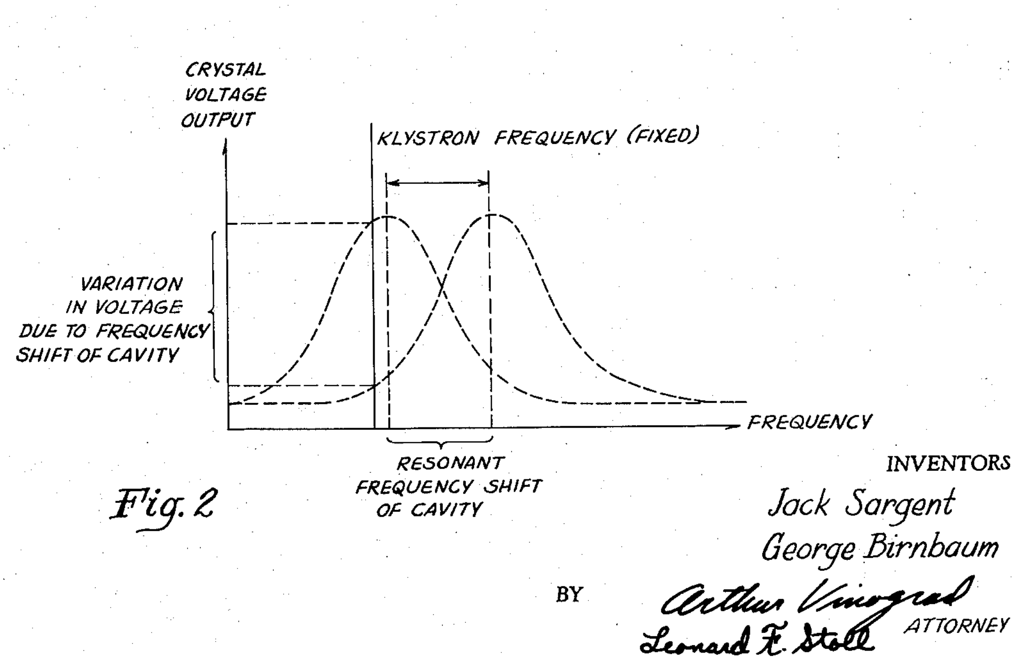
Fig. 2 is a curve representing the resonance responses employed in connection with the detection portion of this invention.

In the representative embodiment disclosed, the carrier wave operates at a center frequency of 9100 mc. and is frequency modulated at a 120-c.p.s. rate with a frequency deviation of 5 mc. The frequency of the modulating signal employed effectively cancels the effect of 60-cycle pickup. Cancellation results because the 60-c.p.s. pickup signal is positive during one sweep of the klystron while it is negative during the next succeeding sweep. The average net effect is therefore zero. As previously indicated, a significant response will be obtained from the detectors when the respective cavity is at resonance. Since the same signal is applied to both cavities, assuming that each cavity has a different resonant frequency of response (see Fig. 2), the characteristic response of each cavity will occur at a different time period relative to the time base defined by the sawtooth signal. In other words, resonance responses displaced in time will be obtained, and the differences in resonances can therefore be converted to a time interval. Such time interval is utilized in the device of this invention to manifest a signal on a recording means and to operate a nulling device in the manner to be described.

Specifically the outputs of the crystal detectors **104*a*, 104*b* are applied to an electronic converter 105 which is detailed in Figs. 3A and 3B to be described. The electronic converter 105 includes separate amplifier and pulse sharpening stages (Fig. 3A) corresponding to each of the detectors 104A and 104B and a pair of similar rectangular wave generators 303*a*, 303*b*** (Fig. 3B) corresponding to the test and reference cavities respectively which are initiated by respective resonant frequency response pulses and terminated by an internally generated voltage as will be described. Two rectangular waves are therefore generated in which the leading edges correspond in time to the respective input pulses from the detectors and in which the trailing edges occur concurrently as determined by said internally generated voltage as will be described.

The output of the converter 105 may then be applied through a chopper-amplifier 106 to a null-balancing mechanism comprising either a coarse or fine servomotor **109*a* or 109*b* respectively, through a selector switch SW100. Each servomotor is mechanically connected to a micrometer feed for displacing either a coarse or fine tuning plunger 115*a* or 115*b***. The null-balance system of the present invention will first be described.

Basically, the null-balance technique employed in connection with the present invention consists of changing the volume of the resonant test cavity **103*a*, and therefore, its frequency, by an amount which is equal to the frequency shift occasioned by a change in the refractive index of the material within the cavity. The required change in volume of the cavity corresponding to restoration of the original frequency is a function of the variation in refractive index and therefore can be used as a measure of the refractive index change. The volume change may be readily obtained by means of the adjustable micrometer-fed tuning plungers 115*a*, 115*b*** provided in the cavity. Returning the plunger to the proper position requires a converter which will not only produce a voltage which is proportional to the resonant frequency displacement, but which can also discriminate between lead and lag of the test pulse with respect to the reference pulse. The specific construction of the cavity resonators including the tuning stubs is illustrated in Fig. 4A and will be described in more detail as the description proceeds.

To obtain a fast response, it is necessary to position the micrometer automatically. This is done by converting the output signal of the electronic converter 105 into an A.C. signal by means of a chopper-amplifier 106. The output from chopper-amplifier 106 is then applied through selector switch SW100 to either of the two-phase servomotors **109*a* and 109*b* which are mechanically coupled to the micrometer feed for the plunger 115*a*, 115*b*, respectively as is more clearly shown in Fig. 4. The switch SW100 symbolizes the connections made between the converter and the coarse and fine micrometer drives. In a practical embodiment of the invention, such connections are automatically made as will be described. When a change in dielectric occurs within the test cavity 103*a* as will be described, the selected servomotor 109*a* or 109*b* will rotate the micrometer feed in such a direction that the output from the converter is brought to zero. Selection of the coarse or fine micrometer for null-balancing depends on the magnitude of the resonant frequency shift of the test cavity. At such balanced position, the resonant frequencies of the test and standard cavities are equal. The direction in which the motor rotates and its speed depend on the polarity and amplitude of the input signal to the chopper-amplifier. Such signal is generated by the electronic converter 105** now to be described.

*Electronic converter (Figs. 3A, 3B)*

As previously indicated, the electronic converter comprises two similar stages, a test cavity stage shown at the top of Fig. 3A and a reference cavity stage shown at the bottom of Fig. 3A. Each stage comprises a signal amplifier 300, clipper-amplifier 301 and pulse sharpener 302. Each stage is connected to corresponding detectors **104*a* and 104*b* respectively. The output of each pulse sharpener section 302 (Fig. 3A) is used to turn on a corresponding rectangular wave generator 303*a* or 303*b*** respectively, shown in Fig. 3B forming part of the converter. Since the two (test and reference cavity) stages shown in Fig. 3A are identical a detailed description of only the test cavity stage will be made.

Referring to Figs. 3A, 3B which is an over-all circuit schematic of the electronic converter 105, the first section of each stage includes an amplifier 300 comprising an amplifier tube V300 connected as a preamplifier characterized by low noise and low microphonics. The capacitor C300 in parallel with resistor R300 in the output of the second section of the amplifier tube V300 provides a reduced upper frequency cutoff and prevents the high-frequency noise which is developed by the crystals from entering the subsequent electronic circuits and also results in an over-all reduction of noise in the output. The minimum upper frequency cutoff (at 3 db) is limited to a point sufficient for the faithful reproduction of the input resonant pulse. The repetition rate of the resonant pulse employed is 120 c.p.s. and a bandpass of the first 6 harmonics is therefore adequate. The gain of the two stages comprising amplifier 300 in Fig. 3A is 1000 and the frequency response at the 3 db points are 40 and 800 c.p.s., respectively. Sufficient details of the amplifier 300 to enable its construction are detailed in Fig. 3. A variable resistor R301 is provided in series with a resistor R302. Resistor R301 can be adjusted so that the phase shift in both the test and reference circuits represented by stages 1 and 2 respectively can be made equal. It will be noted that the peaks of the resonant (response) pulses at points A and A′ in the diagram are clipped. This is due to grid current being drawn by the subsequent clipper-amplifier stage 301.

The clipper-amplifier comprises a pentode V301. The referred-to clipping action is obtained by "starving" the screen grid; that is, by maintaining it at a low potential. The amplified signal therefore consists of only the top 5% of the input signal. Once the screen potential is set, the percentage clipped is reasonably independent of the amplitude of the input signal.

The pulse sharpener circuit 302 comprises the first half of the tube V302 employed as an amplifier and inverter, the second section being operated as a blocking oscillator. The inductances in the plate and grid circuit of the blocking oscillator section of V302 are magnetically coupled by cutting the wire linking the two windings on a 75-U.H.-R.-F. choke L302. The blocking oscillator is triggered when the resonant pulse reaches a potential which is 4% below its peak value. The output signal derived from the blocking oscillator consists of a very sharp pulse as indicated at points C—C′ in Fig. 3A which is actually a severely damped sine function having a frequency of about 5 mc. The corresponding elements in the "reference cavity" stage illustrated in the lower portion of Fig. 3A are identical with the components in the upper or "test cavity" stage and will not be further described. The referred-to time displaced signal outputs from each of the pulse sharpener stages are illustrated in Fig. 3C as curves 1 and any one of curves 2–4. Such outputs are then fed to the rectangular wave generators **303*a*, 303*b* shown in Fig. 3B comprising the tubes V303, V304, V305, and V306.** In the following description it will be shown that the portion of the electronic convertor circuit illustrated in Fig. 3B will produce constant amplitude rectangular-wave output signals corresponding to the pulses from the test and reference cavity stages, the rectangular wave corresponding to the test cavity stage having a variable duration proportional to the time difference between the resonant responses in the test and reference cavities.

The tubes V303, V304, and V306 are thyratrons of the 2D21 type. The control grids of the three thyratrons are maintained at a bias of —3 volts as indicated. With all the thyratrons extinguished in this manner, the capacitor C303 charges from the 250-volt source $E_b$ through the plate resistors R303 and R304 and diode rectifier V305 to a value corresponding to the source $E_b$. Pulses from the blocking oscillators comprising the right-hand section of V302 in either the test or reference stage, trigger the input to the thyratrons V303, V304 and the cathode potentials thereof are increased to a value equal to $$\frac{E_b-E_v}{2}$$

where $E_v$ is the voltage drop across the thyratron in a time interval of $0.3\mu s$. The plate voltages of V303, V304 decrease by a like amount but the capacitor C303 remains charged due to the blocking action provided by the diode V305. The output of V304 is connected to the control grid of thyratron V306 through a delay network RC303 which provide a delay period of approximately one-half of the described 1/120 sec. repetition period (or 1/240 sec.) occasioned by the 120-c.p.s. sweep employed. The thyratron V304 functions to extinguish all three thyratrons simultaneously. That is, whenever thyratron V304 conducts, the resulting signal applied to the control grid of thyratron V306 causes the latter tube to conduct approximately 1/240 of a second later (a value equal to 1/2 the repetition period) to provide a discharge path for capacitor C303. Consequent to such conduction there will occur a rapid oscillatory discharge of capacitor C303 through the choke L303 and the resulting suppression of the plate voltages on the three thyratrons V303, V304 and V306 thereby terminating any output signal at either of the output points D or D′. Since the charging time of the capacitor C303 is limited by the plate resistors of the thyratrons V303 and V304, all three of the thyratrons have sufficient time to deionize.

The operation of the electronic converter in ultimately providing a D.C. control signal having an amplitude proportional to the difference in the time of occurrence between the resonant response peaks (Fig. 2) obtained from the test and reference cavities, and a polarity determined by lead or lag of the test-cavity pulse relative to the reference-cavity pulse, can now be described. Such operation will be readily apparent by considering Fig. 3B together with the related wave-and timing diagram shown in Fig. 3C. In Fig. 3C, curve 1 represents the sharpened pulses emanating from Reference Cavity Stage (Fig. 3A) consequent to detection of a resonant frequency response in such stage as described. Such pulses have a recurrence frequency of 1/12 a second and define a time base for purposes of explanation.

Curves 2, 3, and 4 in Fig. 3C show three different responses which may be obtained from the Test Cavity Stage (Fig. 3A) consequent to detection of a resonant frequency response in that stage. It will be recalled that such resonant frequency response can occur either before the occurrence of the reference cavity stage response, concurrently therewith or following such reference cavity stage response. Curve 2 illustrates the condition (I) in which the test cavity stage response occurs before or leads the reference cavity stage response; curve 2 illustrates the condition (II) in which the test cavity stage response coincides with that of the reference cavity stage; curve 3 shows the condition (III) wherein the test cavity stage response occurs after or lags the reference cavity stage response.

Since, as already described, a signal (curve 1) from the reference cavity stage will cause the corresponding rectangular wave generator 303*b* (V304, Fig. 3B) to conduct and produce a rectangular wave which is always terminated 1/240 second later (because of the described action of network RC303 and tube V306), the output at terminal D′, Fig. 3 can be represented by the waveform shown in curve 1R in Fig. 3C. The leading edge of such rectangular wave coincides with the pulses in curve 1 and the wave is terminated 1/240 second later as shown. In Fig. 3C, the rectangular waveforms shown as curves 1R–4R correspond to the initiating pulses identified as curves 1–4 respectively. To facilitate identification, the cross-hatch symbols adjacent each of the waveforms 1–4 correspond to the like cross-hatched waveform 1R–4R.

Now consider the action of the rectangular wave generator 303*a* (V303) corresponding to the test cavity stage. As already explained such action is determined by either one of the three-previously enumerated conditions I, II or III. These conditions are also enumerated in Fig. 3C. If the test cavity stage pulses lead the reference cavity stage pulses as shown by waveform 2, Fig. 3C, then tube V303 will conduct to produce a rectangular-wave output at terminal D (waveform 2R, Fig. 3C). That is, the leading edge of such rectangular wave 2R coincides with the pulses of waveform 2 and since such pulse, under assumed condition I leads the reference cavity stage output pulse (waveform 1), the latter will then trigger rectangular wave generator tube V304 which always functions to generate the referred-to internal extinguishing signal 1/240 second later. In other words, the reference pulse (1) causes V304 to generate rectangular waveform 1R, Fig. 3C, having a trailing edge which defines in point of time, termination of any rectangular wave generated by rectangular wave generator 303*a* (V303). Hence, the referred-to rectangular waveform 2R is terminated coincidently with the trailing edge of waveform 1R.

By analogy, it can be shown that when the test cavity stage pulse coincides with the output of the reference cavity stage as shown by waveform 3, the rectangular wave output 3R from rectangular wave generator 303*a* (V303) will coincide with the reference cavity stage rectangular waveform 1R.

Similarly, when the test cavity stage pulse (waveform 4) lags the reference cavity stage pulse (waveform 1), the leading edge of the corresponding rectangular wave output 4R from V303 will occur simultaneous with the pulses of waveform 4 and will be terminated coincident with the trailing edge of waveform 1R. In other words the time of occurrence of the rectangular-wave output from test cavity stage rectangular-wave generator 303*a* is determined by the time of occurrence of the test stage output pulse (waveforms 2, 3, or 4) relative to the reference cavity stage pulse (waveform 1); the termination of such rectangular wave output, however is the same and always coincides with the trailing edge of the reference-stage rectangular waveform 1R regardless of the phase between the outputs of the test and reference stages.

In the above-described manner, there will be obtained at terminal D′ (Fig. 3B) a waveform corresponding to waveform 1R of Fig. 3C while any one of the waveforms 2R, 3R or 4R will be manifested at terminal D (Fig. 3B) depending on the condition of operation as described.

Such waveforms are applied to a clipper amplifier stage V307 which functions to keep the rectangular-wave shown in Fig. 3C (waveforms 1R–4R) at a constant amplitude. The rectangular wave signals are then applied to the averaging circuit RC304, Fig. 3B, which function to generate a D.C. control voltage having an amplitude duration of the rectangular wave at terminal D and a polarity determined by the phase between the outputs of the test and reference cavity stages in the manner now to be described.

The referred-to averaging network RC304 is shown in Fig. 3B. It consists of a series-parallel symmetrical arrangement of resistors and capacitors as indicated providing two input connections corresponding to points D—D′ and two output terminals corresponding to point E—E′.

The described rectangular-wave output pulses generated by tubes V303 and V304 respectively are positive but are applied to opposite sides of the averaging circuit with respect to ground. The net output is therefore the difference between the averaged signals as measured at points E—E′ in Fig. 3B.

The potentiometer R305 is used to initially balance the network. The output from the electronic converter 105 is applied to the chopper amplifier 106 which is also shown in Fig. 1. The chopper amplifier 106 converts the difference in D.C. potential obtained between points E and E′ in Fig. 3B into a 60-c.p.s. signal which is used to actuate either of the two-phase servomotors 109a, 109b to which the chopper amplifier is selectively coupled by switch SW100. The servomotors employed have a maximum rotational speed of 150 r.p.m. and a direction of rotation which is determined by the polarity of the referred-to D.C. signal applied to the chopper amplifier 106. C305 and L305 shown connected to the output leads of the chopper amplifier in Fig. 3B comprise a high-pass filter designed to eliminate the low-frequency chatter normally encountered due to the 60-c.p.s. signal. The chopper-amplifier may be of a Brown amplifier identified as part No. 353170–1 made by the Brown Instrument Company. A 5-c.p.s. signal is inserted in the averaging network RC304 as shown in Fig. 3B to prevent the possibility of occurrence of a dead zone in the servomotor.

*Cavities 103a, 103b (Fig. 4)*

The test cavity 103a (Fig. 1) is further detailed in Fig. 4A. The reference cavity 103b is of similar construction but lacks mechanical control of the tuning plungers. The cavities are made of brass and are designed for operation in the $TE_{012}$mode at a frequency of 9100 mc. The cavities have an internal diameter of 1.71 inches and a length of 3.45 inches to prevent the cavity from oscillating spuriously in other nearby modes. To match the impedance of the waveguides, the inlet and outlet irises 401, 402 have a diameter of 0.25 and 0.24 inch, respectively. The increased conductivity provided by silverplating the cavities enables a Q of 17,500 to be obtained. The frequency control means for each cavity comprises a course plunger 115a and a fine plunger 115b mounted in each end.

The plungers are actuated by the servomotors 109a, 109b through a respective micrometer-feed mechanism comprising the transmission gears 405a, 405b. The position of each plunger is continuously measured by micrometer position detectors 108a, 108b which are in the form of ten-turn potentiometers coupled to the servomotor transmission gears 405a, 405b.

Preferably, the design of the cavity tuning system is such as to obtain a linear relation between plunger penetration and resonant frequency shift (tuning rate). Such linearity permits the use of a linear recorder scale in connection with the measuring manifesting means and further enables the gain of the over-all servosystem, which is a function of the tuning rate, to be constant. To accomplish such result, each of the micrometer plungers 115a, 115b are mounted in the cavity end plates 410a, 410b with the plunger extending into the point of maximum electric field (quarter wavelength). At such position, the resonant frequency shift is rendered proportional to a small variation of plunger penetration.

An important design characteristic of the present invention is the provision of a plurality of different tuning rates so as to obtain sufficient sensitivity for the measurement of relative humidity at both high and low temperatures. Since there is only one point along the main axis of a single mode cavity at which a maximum electric field exists, it would be physically impossible to have both plungers vary about the same point. The present apparatus therefore employs a two-mode cavity enabling the use of two plungers inserted into the opposite end plates 410a, 410b. Each plunger is mechanically driven by their respective servomotors at a different tuning rate (fine and coarse) the rates being linear.

A maximum variation in plunger penetration of 5 mm. was found satisfactory to maintain the referred-to linear relation with frequency shift. The resonant frequency shift of the test cavity 103a is proportional to the volume displaced by a plunger and therefore the tuning rate of the plunger is proportional to the square of its diameter. The coarse and fine micrometer plungers 115a, 115b have nominal tuning rates in the ratio of 100:1 and diameters of 0.077 and 0.007 inch, respectively. With such ratios, the hygrometer according to this invention has a four-decade range extending from approximately 6 to 0.005 mc.

The cavity plunger operating mechanism detailed in Fig. 4A is symbolically illustrated in Fig. 1; the plunger 115, servomotor drive 109, and microposition detector 108 being designated by corresponding numerals. The dotted line representation in Fig. 1 corresponds to the mechanical coupling among the elements.

Considering both Fig. 1 and Fig. 4A, it will be apparent from the preceding description, that the signal output from the converter circuit (Figs. 3A, 3B) will drive either the fine or coarse servomotors 109a, 109b in a direction determined by the polarity of the output signal and for a period determined by the difference in resonant frequency between the test and reference cavities. Accordingly, actuation of the cavity plungers 115a, 115b in this manner functions to retune the frequency of the test cavity in a direction that tends to reduce the referred-to frequency difference to zero in accordance with the theory described in connection with Equation 2 above.

In connection with the construction of the cavity shown in Fig. 4A, it will be noted that the end plates may, if desired, be adjustably mounted to permit axial displacement thereof relative to the longitudinal axis of the cavity as detailed in the modification of Fig. 4B. In Fig. 4B, the end plate 410′ is slidably mounted with respect to the cavity 103 in the direction indicated by the arrow permitting displacement of the end plates to vary the volume of the cavity. When such modification is employed, the frequency change occasioned by the resulting volume change may readily be nulled in the same manner as in the operation of the instrument to measure refractive index or vapor pressure. The use of the instrument as an extremely sensitive displacement detector is therefore apparent.

*Micrometer position recorder 107 (Fig. 7)*

The micrometer position recorder 107 shown in the diagram of Fig. 1 is operatively connectable to either of the micrometer position detectors 108a, 108b by the switch SW100. The construction of the positions of such mechanism pertinent to the invention is illustrated in somewhat more detail in Fig. 7. The recorder is of a commercially available type such as a Brown 100 millivolt recorder. The significant portions of such recorder are diagrammatically shown in the portion of Fig. 7 which is delineated by a broken outline, the portion of the circuit shown at the bottom of Fig. 7 shows the modification of such instrument made in accordance with the requirements of this invention.

As illustrated in the upper portion of Fig. 7, the recorder 107 includes an amplifier 700, which feeds a servomotor 701. The servomotor is mechanically connected to the slide wire contact 702 of the recorder. The wiper arm of such slide wire contact is in turn electrically connected as an input to amplifier 700.

The coarse and fine micrometer position detectors 108a and 108b identified in Fig. 1 are indicated in Fig. 7 by like designated potentiometers. Either the coarse or fine position detector 108a and 108b may be selectively connected to amplifier 700 of the recorder by means of the switch SW100 identified in connection with Fig. 1. It will be apparent that the difference in potential between the referred-to slide wire contact 702 and either of the selected micrometer position detectors 108*a* and 108*b* is in this manner applied to the recorder amplifier 700. The resulting energization of amplifier 700 therefore tends to drive the recorder servomotor 701 in a direction which will reduce the potential difference to zero. It will therefore be apparent that by virtue of such described construction, any displacement in the movable contactor of the micrometer position detector (ten-turn potentiometer 108*a* or 108*b*) will be reflected as a corresponding displacement of the slide-wire contactor 702 in the recorder and the magnitude of the displacement is determined by the ratio of the referred-to potential difference across such adjustable elements.

The micrometer position detector-potentiometers 108*a*, 108*b*, only the resistive portions of which are symbolized in Fig. 7, are mechanically coupled to the plunger drive mechanism and servomotors 109*a*, 109*b* as described in connection with Fig. 4A.

The latter servomotors are independent from the above-described servomotor in the recorder 107 and function to bring the resonant frequencies of the test and reference cavities 103*a*, 103*b* to the same value. That is, once the two cavities are tuned to the same resonant frequency, the position of the tuning plungers corresponding to such frequency as registered by the associated ten-turn micrometer position detector potentiometer 108*a* and 108*b* is recorded by the micrometer position recorder 107 in the above-described manner.

The cavity tuning and recording system having been explained, the remaining elements of the gas or hygrometer system shown in Fig. 1 can now be described. As indicated in the schematic diagram of Fig. 1, a flowmeter 110 is provided for receiving the gas to be tested. The flowmeter 110 is connected to a drying mechanism which may be in the form of "Drierite" drying tubes 111, and to one section of the heat exchange coils 113. The dried gas may then be applied to the reference cavity 103*b*. A three-way stopcock or valve 112 is provided as indicated so that either the dried gas or the gas to be tested can be conducted through the remaining section of the heat exchange coils 113 to the test cavity 103*a*. The detailed construction of the cavities is illustrated in Fig. 4A.

Referring again to Fig. 4A, each of the cavities 103*a*, 103*b* are shown as including a gas inlet port 406 connected to the heat exchange coils (Fig. 1) and a gas outlet port 407. A pressure tap 408 is provided on one end wall of the cavity as shown. A mica window 409 is cemented to the inlet iris 401, to prevent the humid air in the test cavity from entering the waveguide.

The total index of refraction of moist air is equal to the sum of terms contributed by the dry air and that of the water vapor. If dry air is maintained in the reference cavity 103*b*, then the difference in refractive index of the gases within the cavities will be due only to the water vapor content within the test cavity 103*a*. This presupposes that the temperature and pressure of the gases within the cavities, which determine density and therefore refractive index, are equalized. In addition, the refractive index of the water vapor content of the air is a function of its temperature. As above described, provision is made for keeping the gas temperatures at a fixed value by means of the heat exchange coils 113 (Fig. 1) and temperature control system shown in Fig. 8 to be described.

The gas to be tested is applied to the flowmeter 110 (Fig. 1) under a positive pressure of 4 p.s.i.g. and at a rate of 4 l.p.m. Under operating conditions, the gas divides about equally, one part flowing through the test cavity 103*a*, the other part through the reference cavity 103*b*. The heat exchange coils 113 consist of 15 ft. of ¼" copper tubing and act as radiators to bring the temperature of the gas to equilibrium with the ambient temperature within temperature-controlled chamber 116 which houses the apparatus. The chamber is symbolized in Fig. 1 by the broken line outline. The "Drierite" apparatus 111 indicated in Fig. 1 may be a two-stage drying train containing "Drierite" and phosphorous pentoxide. The three-way stopcock 112 permits either the sampled gas or the dried gas to be applied to test cavity 103*a*.

The chamber 116 symbolized in broken lines in Fig. 1 is an insulated box of any conventional construction. In connection with the immediate embodiment disclosed, a wooden box having a wall thickness of ¾" was employed. The outside of the box was covered with a glass wool blanket and the inside walls were lined with aluminum foil. The chamber is also provided with a gas circulation system symbolized by heat exchange coils 113 maintained at a temperature of approximately 45° C. Temperature regulation is accomplished by means of a modulated pulse with a temperature controller as will be described in connection with Fig. 8. Thermocouples, not shown, are employed to measure the inlet and outlet gas temperatures of both cavities and the body temperature of the cavities. The chamber 116 is provided with a thermistor and associated bridge circuit 802 (see Fig. 8) for measuring the chamber temperature.

Since the temperature of the gas entering the cavities is held constant in the above-indicated manner, the recorder scale of micrometer position recorder 107 can be calibrated directly in vapor pressure and can be used to measure and record continuously the water vapor pressure of the air stream under test. The stopcock 112 provides a convenient means for periodically establishing a zero position since the dried air can be in this manner introduced into test cavity 103*a* for calibration purposes.

*Calibration*

By using gases having accurately-determined dielectric constants, calibration of the hygrometer is readily implemented. Specifically, helium, raised to a temperature of about 45° C. by the heat exchange coils 113 was used to flush both the test and reference cavities. $CO_2$ was then substituted for the helium in the test cavity and the resulting shift in the recorder position noted. At 20° C. and 1 atmosphere, the values for the quantity $(E-1)10^6$ of helium and $CO_2$ are 65.0±0.4 and 922±1, respectively. See table of dielectric constants and electric dipole moments of substance in the gaseous state, NBS Circular 537 (1953), by Maryott and Buckley. It is well known that $$\frac{\epsilon-1}{\epsilon+2}$$

is proportional to the density of nonpolar gases. Since $\epsilon-1$ is less than $10^{-3}$ and the loss factor is negligible, the quantity $\epsilon-1$ is therefore proportional to the density. Taking into account the pressure and temperature of the gases in the test cavity and converting the quantity $E-1$ into N-units, there resulted in a calibration constant of the coarse plunger of 3.373 N-units/division where $$N \approx \left(\frac{\epsilon-1}{2}\right)10^6$$

The temperature within chamber 116 is precisely controlled at 45° C. by the temperature controller circuit which is detailed in Fig. 8. Electrical heater elements (not shown) are suitably positioned within chamber 116 and connected to the heater control relay contacts 801 (Fig. 8).

A modulated pulse width temperature controller circuit is employed. The control circuit is designed to cycle the relay 800 at a fixed repetition rate and to have a duty ratio that is linearly related to the amplitude of an applied D.C. potential which, as will be described, is obtained from the temperature measuring bridge 802 mounted within chamber 116 (Fig. 1) and forming part of the control circuit of Fig. 8. Duty ratio, in this case, may be defined as the ratio of the time-on period to the repetition period. For zero voltage input (i.e. bridge balanced), the duty ratio is 50%. When the bridge becomes unbalanced, the duty ratio will either decerase or increase, depending on the polarity output of the bridge.

Referring specifically to Fig. 8, the temperature measuring bridge 802 is shown as comprising a thermistor 803 connected in a Wheatstone bridge circuit. The bridge output is applied to a chopper-amplifier 804 (Brown converter-amplifier Part No. 353170–1) suitably modified as shown in Fig. 9 to be described to give a push-pull D.C. potential output. The D.C. outputs from amplifier 804 are applied respectively to V800 and V801.

The circuit comprising the 2D21 gaseous discharge tube V802 generates a 1 c.p.s. sawtooth signal which is applied to cathode follower V803*a*. One output of cathode follower V803*a* is differentiated by the circuit comprising capacitor C800 and resistor R800 and is then applied through a second cathode follower V803*b* as a second input to V801. The sawtooth signal obtained from the first-mentioned cathode follower V803*a* is applied through conductor 805 as a third input to V801. The resistors R801 together with the left-hand section of V801 function as a summing network for adding the three referred-to signal inputs. The resultant signal across cathode resistor R802 is applied to the winding of the heater control relay 800. As previously-mentioned such winding is also connected to receive the second D.C. output from the chopper amplifier 804 through cathode follower V800.

The adjustments of the circuit are such that when the temperature measuring bridge 802 is balanced, relay 800 will close when the sawtooth signal generated by V802 reaches its mid-potential. The relay remains closed until the sawtooth signal decreases to zero at which point the relay will open. Opening of the relay 800 is aided by the negative (differentiated) pulse comprising the second described input signal above. A duty ratio of 50% is obtained under these conditions. When the bridge is unbalanced, the D.C. output voltage from chopper amplifier 804 shifts the referred-to sawtooth voltage level so that relay 800 will close either before or after the referred-to mid-potential point of the sawtooth signal. Such action effectively results in a change (increase or decrease) of the duty cycle, depending on the polarity input to amplifier 804.

Although the maximum duty ratio is limited to approximately 95% by the negative pulse, the over-all performance of the temperature controller is not similarly limited. When the potential level of the sawtooth is decreased sufficiently, the relay 800 is not actuated during the cycle so that the duty ratio is 0%. If the potential level were permitted to decrease still further, the relay would again be actuated, since it cannot discriminate between polarities. However, such condition of instability is never reached due to the saturation of the amplifier. Moreover, if an amplifier is employed which does not saturate at the proper level, then the condition of instability can be corrected by inserting a diode rectifier in series with the relay.

It will be apparent that if the repetition frequency of the relay 800, which controls the power to the heating elements (not shown), is sufficiently high, and the thermal capacity of the chamber and heating elements is sufficiently large, then the input power pulses will be averaged. Such effect results in a drastic reduction of the temperature fluctuations as compared with the temperature fluctuations normally encountered with the ordinary two-position type temperature controller. The amount of power to be controlled is limited only by the current carrying capacity of relay 800. Large amounts of power may therefore be readily handled by the temperature control mechanism of this invention by merely employing relays in cascade.

The referred-to modification of the Brown converter-amplifier is illustrated in Fig. 9. A pair of 12AU7 tubes V901 and V902 are connected to a source of alternating current so that the plates of each tube are alternately rendered conducting. The signal output from the previous stages (not shown) of the chopper amplifier 804 are applied concurrently to the grids of both tubes. A push-pull D.C. output is thereby obtained across the cathodes of the tubes for application to the grids of V800 and V801 in the manner described in connection with Fig. 8.

The klystron 102 (Fig. 1) may be a Varian V–50 requiring a beam potential of 300 volts at 25 ma. and a reflector potential of −135 volts in order to operate in the fifth mode. Under these conditions, the tuning is about 1 volt/mc.

The sawtooth generator 101 which modulates klystron 102 (Fig. 1) is detailed in Fig. 5. The sawtooth generator comprises a full-wave rectifier V500 which supplies a 120-c.p.s. signal to the left-hand grid of V501. Such signal is amplified and applied by the right-hand section to the thyratron V502. The latter, when triggered by the 120-c.p.s. signal, charges capacitor C500 which is in the plate circuit. The left-hand portion of V503 assures constant charging of capacitor C500. The right-hand section of V503 is connected as a cathode follower operating below ground. The output is obtained across potentiometer R500 and applied to the reflector terminal of the klystron. Potentiometer R500 serves to regulate the amplitude of the sawtooth signal. The circuit shown in Fig. 5 thereby provides a frequency-modulated signal having a frequency deviation of 5 mc. and a repetition or sweep frequency of 120 c.p.s.

The apparatus of this invention also employs a protective circuit for the klystron. Such protective circuit as illustrated in Fig. 6 employs a plurality of relays designated as relay 1, relay 2, and relay 3 which protect the klystron against overload currents and also prevent turning on the beam supply before the reflector voltage is applied. As is apparent from Fig. 6, when the B-voltage is on, relay 1 will be energized by the circuit including resistor R600. The winding for relay 2 is included in a circuit operated by the push-button control 600. When push-button 600 is depressed, a circuit is completed from B+ through the switch SW600, the upper contact of relay 3, the winding of relay 2 and R601. A circuit is thereby completed from B+, the lower contacts of relay 1 and relay 2, to the beam of the klystron which draws approximately 25 ma. Such current is insufficient to energize relay 3. When push-button 600 is released, the beam supply remains on due to the holding action of relay 2. Relay 3 is designed to be energized by a 35 ma. current. Therefore if the current to the klystron should increase to a corresponding amplitude, the resulting energization of relay 3 will cut off the B+ supply to the klystron, and to relay 2. This results in deenergization of relay 3, but the voltage supply for the klystron beam will remain cut off until relay 2 is again energized by the push-button control 600 in the above-described manner.

It will be apparent that the embodiments shown are only exemplary and that various modifications can be made in construction and arrangement within the scope of invention as defined in the appended claims.

What is claimed is:

1. A hygrometer for determining the difference in refractive index between a test gas and a dry reference gas particularly at extremely low vapor pressures comprising a source of microwave signals, a first two-mode test cavity resonator having a plurality of tuning plungers initially positioned within the test cavity with the plungers extending into the point of maximum electric field and a tunable reference cavity resonator connected to said signal source, fluid conducting means connected to said cavity resonators for introducing a test gas, and a dry reference gas into said cavity resonators respectively, means for modulating the frequency of said microwave signal source to sweep the frequency to which each of said cavity resonators are tuned linearly with respect to time, means for detecting the resonant frequency responses of said cavities, means responsive to said detecting means for generating a control signal having an amplitude corresponding to the time interval between said resonant responses and a polarity determined by the relative times of occurrences of said resonant frequency responses, micrometer feed means connected to said plurality of tuning plungers, means operatively coupled to said plunger means and connected to said signal generating means for displacing said plungers in a direction determined by the polarity of said control signal and an amount proportional to the duration thereof for restoring the resonant frequency response of said test cavity to a value corresponding to that of said reference cavity, and means connected to said plunger means for manifesting the linear displacement thereof as a function of the vapor pressure in the test gas.

2. The invention of claim 1 in which said tuning plungers comprise coarse and fine tuning plungers each having a micrometer drive, servomotor means connected to each of said micrometer drives and means for connecting said control signal generating means and said manifesting means to each of said plunger micrometer drives.

3. The invention of claim 1 in which said fluid conducting means includes valve means for selectively applying either said dry or moisture bearing gas to said test cavity.

4. The invention of claim 1 in which said hygrometer is mounted in an insulated enclosure, means for measuring the temperature within said enclosure, heater means and a modulated pulse width temperature controlling circuit operatively connected to said measuring and heater means for precisely regulating the temperature within said enclosure.

5. In a hygrometer having a plurality of tunable gas-filled cavity resonators connected to a source of frequency-modulated microwave signals for sweeping the frequency to which each cavity is tuned linearly with respect to time and having means for separately detecting the resonant frequency responses of each cavity, means for automatically keeping the resonant frequencies of said respective cavities in consonance comprising motive means for tuning at least one of said cavities, means for converting the time difference between the occurrence of each of said resonant frequency response into a control signal corresponding to said time difference for energizing said motive means comprising, a first and second gaseous discharge tube energizable respectively by each of said detected signals, a capacitor, circuit means including a diode for charging said capacitor from a source of potential, said circuit means including an electrode of each of said first and second gaseous discharge tubes, and a control tube connected to said capacitor and energized by energization of said second gaseous discharge tube for discharging said capacitor and thereby extinguishing said first and second gaseous discharge tubes.

6. The invention of claim 5 in which a time-delay circuit is provided between said second gaseous discharge tube and said control tube.

7. The invention of claim 6 including an averaging circuit having separate signal integrating means and means connecting the output of said first and second gaseous discharge tubes individually to respective ones of said signal integrating means.

8. The invention of claim 7 in which each of said signal integrating means comprises symmetrically arranged resistor-capacitor networks having a common ground and separate inputs corresponding respectively to the outputs of said first and second discharge tubes the output of said averaging circuit being obtained across the ungrounded terminals of said integrating means.

9. A microwave refractometer for determining the refractive index of a test gas by comparison with the known refractive index of a reference gas comprising a source of microwave signals, a first two-mode test cavity resonator having a plurality of tuning plungers initially positioned in the test cavity with the plungers extending into the point of maximum electric field, a second tunable reference cavity, means connecting said test and reference cavity to said source, means for introducing a test gas, and a reference gas having a known index of refraction into said test and reference cavities respectively, means for modulating the frequency of said microwave signal source to sweep the frequency to which each of said cavity resonators are tuned linearly with respect to time, means for detecting the resonant frequency responses of said cavity resonators, means responsive to said detecting means for generating a control signal having an amplitude corresponding to the time interval between said resonant responses and a polarity determined by the relative times of occurrences of said resonant frequency responses, motive means operatively connected to said test cavity tuning plungers and responsive to said control signal generating means for displacing said plungers in a direction relative to said initial position within said test cavity determined by the polarity of said control signal and by an amount proportional to the duration thereof for restoring the resonant frequency response of said test cavity resonator to a value corresponding to that of said reference cavity resonator, and means connected to said plungers for registering the linear displacement thereof consequent to said restoration as a function of the refractive index of said test gas.

10. A device for determining the refractive index of a test gas by comparison with the known refractive index of a reference gas comprising: a test cavity containing a test gas, at least one tuning plunger positioned at a reference point in said test cavity, a reference cavity containing said reference gas, a signal source connected to said test and reference cavity, means for modulating the frequency of said signal source to sweep the resonant response curve of said test and reference cavity linearly with respect to time, means for generating a first and second pulse occurring in time in dependency upon the resonant frequency of said test and reference cavity, respectively, means responsive to said first and second pulse for generating a first and second waveform, respectively, each having a leading edge and a trailing edge, the trailing edge of each waveform occurring substantially at the same instant of time, means responsive to said first and second waveform for generating a direct current signal having a polarity and duration dependent upon the difference in time of occurrence of the leading edge of said first and second waveform, and means connected to said plunger and responsive to said direct current signal for displacing said plunger in a direction relative to said reference position in dependency upon the polarity and duration of said direct current signal.

References Cited in the file of this patent

UNITED STATES PATENTS

| | | |
|---|---|---|
| 2,457,673 | Hershberger | Dec. 28, 1948 |
| 2,580,968 | Sproull | Jan. 1, 1952 |
| 2,602,835 | Hershberger | July 8, 1952 |
| 2,605,394 | Van Voorhis et al. | July 29, 1952 |
| 2,611,030 | Sontheimer | Sept. 16, 1952 |
| 2,774,034 | Young | Dec. 11, 1956 |
| 2,783,383 | Robins | Feb. 26, 1957 |
| 2,792,548 | Hershberger | May 14, 1957 |

OTHER REFERENCES

George Birnbaum: "A Recording Microwave Refractometer." The Review of Scientific Instruments, vol. 21, No. 2, February 1950; pp. 169–176.